No. 777,537. PATENTED DEC. 13, 1904.
J. K. PROCTOR.
MACHINE FOR GRINDING THE TEETH OF PICKER CYLINDERS.
APPLICATION FILED APR. 12, 1904.
NO MODEL.

Witnesses:

Inventor:
Josiah K. Proctor
by his Attorneys,

No. 777,537.

Patented December 13, 1904.

UNITED STATES PATENT OFFICE.

JOSIAH K. PROCTOR, OF PHILADELPHIA, PENNSYLVANIA, ASSIGNOR TO THE PHILADELPHIA TEXTILE MACHINERY COMPANY, OF PHILADELPHIA, PENNSYLVANIA, A CORPORATION OF PENNSYLVANIA.

MACHINE FOR GRINDING THE TEETH OF PICKER-CYLINDERS.

SPECIFICATION forming part of Letters Patent No. 777,537, dated December 13, 1904.

Application filed April 12, 1904. Serial No. 202,859. (No model.)

*To all whom it may concern:*

Be it known that I, JOSIAH K. PROCTOR, a citizen of the United States, residing in Philadelphia, Pennsylvania, have invented certain Improvements in Machines for Grinding the Teeth of Picker-Cylinders, of which the following is a specification.

My invention relates to certain improvements in machines for grinding the teeth of rag-picking or shoddy-picking machines.

The object of my invention is to construct a grinding apparatus which will quickly and accurately grind the teeth of the cylinder and which can be readily applied to a machine or can be left in position on the machine and the grinding-wheel moved out of the path of the teeth, as fully described hereinafter.

The ordinary method of grinding the teeth of shoddy or rag pickers is to use a hand-grinder pressed against the teeth as the toothed cylinder revolves. This is a very dangerous method of sharpening the teeth and at the same time the teeth are not evenly ground. To produce the best results, the ends of the teeth must be ground perfectly flat, so that a sharp corner is formed on each tooth and the teeth should be of the same length. By my invention I am enabled to provide means for grinding the teeth, so that they will all be of the same length, and which can be readily detached from the machine, if desired, or the grinding-wheel can be moved clear of the toothed cylinder.

Figure 1:
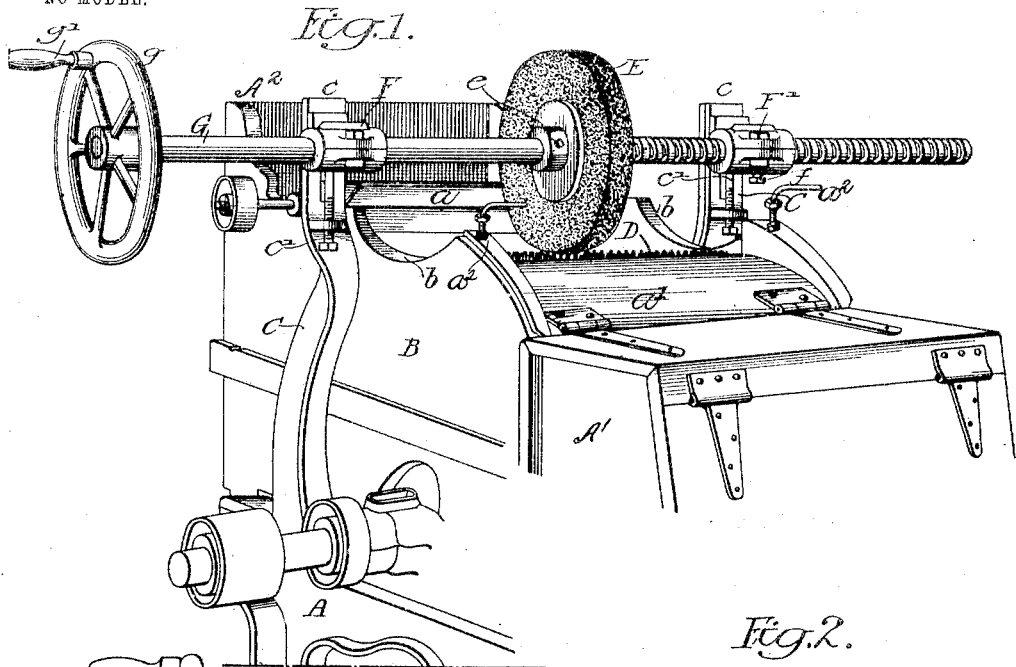
Figure 2:
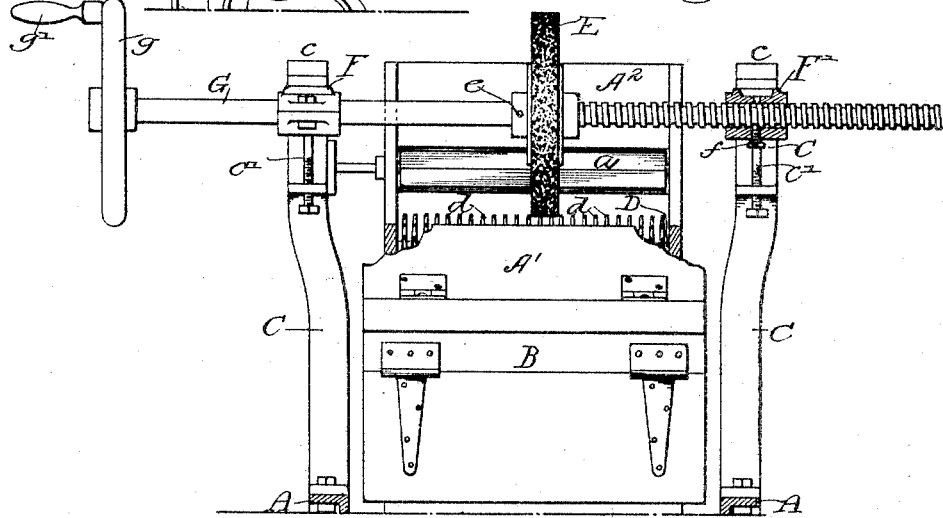
Figure 3:
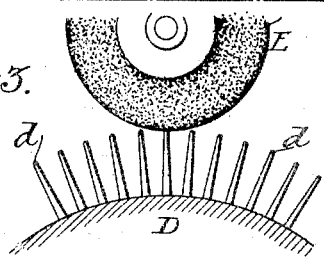

In the accompanying drawings, Figure 1 is a perspective view of sufficient of a shoddy-picking machine to illustrate my invention. Fig. 2 is a face view partly in section. Fig. 3 is an enlarged view showing the teeth of the picker-cylinder.

A is the base of a shoddy-picking machine, supporting the casing B, which can be of any suitable type.

D is the cylinder of the machine, having teeth $d$. The teeth are made in the manner clearly shown in Fig. 3, with flat ends and comparatively sharp edges.

A' is a box inclosing the feed-rolls.

$A^2$ is a receptacle to receive lumps or bits, and $a$ is the lump-roll driven in any suitable manner.

Hinged to the box A' is a plate $a'$, having flanges which extend over the casing B, and $a^2 a^2$ are screws for adjusting the plate $a'$ in respect to the cylinder D.

The material is fed to the picker through an opening in the front of the casing B. Each edge of the casing is recessed at $b\ b$ to allow the grinding-wheel E to be moved clear of the toothed cylinder.

C C are brackets secured to the base A of the machine in the present instance and projecting from the base on each side of the casing B. Carried by these brackets are boxes F F', in which is mounted the shaft G, carrying the grinding-wheel E. One half of the shaft is plain, as shown in Fig. 1, while the other half has a screw-thread cut thereon. The two boxes F F' are plain in the present instance; but the box F' has a screw $f$, which enters the thread on the shaft and forms a nut, so that when the shaft is turned the grinding-wheel is traversed across the machine.

The wheel E is an emery or corundum wheel in the present instance and is fixed to the shaft G by a set-screw $e$. On the end of the shaft G is a wheel $g$, having a handle $g'$, by which the shaft is turned.

The boxes F F' are mounted on slideways $c\ c$ on the brackets C and can be adjusted vertically by set-screws $c'$. By this means the shaft G and its grinding-wheel can be moved toward and from the teeth $d$ of the cylinder D.

If the grinding apparatus remains on the machine, the wheel when not in use is moved to either side past the recess $b$ of the frame B, so as to be clear of the teeth of the picker-cylinder; but when it is wished to grind the ends of the teeth all that is necessary is to revolve the picker-cylinder by power and turn the shaft G, which not only revolves the grinding-wheel G, but also feeds it across the machine, and consequently across the teeth of the cylinder as it revolves, grinding all the teeth of the cylinder and insuring their projecting a given distance from the cylinder. The grinding-wheel can be fed backward and forward by simply turning the shaft in the reverse direction. When the grinding-wheel is turned the full width of the machine and when the operator sees that the teeth are sufficiently ground, he turns the shaft to move the grinding-wheel to one side clear of the picker-cylinder.

When there are two or more picking-machines in one mill, then the grinding apparatus can be detached from one machine and mounted on another when it is desired to grind the teeth, either by removing the brackets and the shaft with the grinding-wheel or making the brackets a permanent part of each machine and the boxes removable, so that only the boxes and the shaft need be removed.

I claim as my invention—

1. The combination in a rag or shoddy picking machine, of a frame, a toothed cylinder mounted on said frame, brackets carried by the frame, bearings on the brackets, a transverse shaft having a screw-thread thereon, a device on one of the bearings engaging the threads of the shaft, a grinding-wheel on the shaft, and means for turning the shaft so as to rotate the grinding-wheel and feed it across the machine, substantially as described.

2. The combination in a rag or shoddy picking machine, of a frame, a picking-cylinder having teeth thereon, brackets on the frame, adjustable bearings mounted on the brackets, a transverse shaft having a screw-thread thereon, a device on one of the bearings engaging the thread of the shaft, a grinding-wheel fixed to the shaft, and means for turning the shaft so as to feed it across the machine, substantially as described.

3. The combination in a rag or shoddy picking machine, of a frame, a toothed cylinder mounted thereon, a casing inclosing the cylinder, brackets, bearings on the brackets, a transverse shaft, a grinding-wheel on said shaft, and means for feeding the grinding-wheel across the machine, the casing of the machine being recessed at each end to allow the grinding-wheel to pass to one side of the cylinder to clear the teeth thereof, substantially as described.

4. The combination in a rag or shoddy picking machine, of a frame, a toothed cylinder mounted on said frame, a casing inclosing the said cylinder, brackets extending from each side of the frame outside of the casing, said casing being open at the top and recessed at each end, adjustable bearings on the brackets, a transverse shaft mounted in the bearings, a grinding-wheel secured to the shaft about midway between the ends, the portion of the shaft on one side of the wheel being plain, the other portion having a screw-thread, a device on one of the bearings engaging the thread on the shaft, and means for rotating the shaft, so that the teeth of the toothed cylinder can be ground as the cylinder revolves, by turning the screw-shaft to feed the grinding-wheel across the face of the cylinder in contact with the ends of the teeth, substantially as described.

In testimony whereof I have signed my name to this specification in the presence of two subscribing witnesses.

JOSIAH K. PROCTOR.

Witnesses:
C. W. SCHWARTZ, Jr.,
E. C. SPICE.